(No Model.)

F. H. BOLTE.
VELOCIPEDE WHEEL TIRE.

No. 479,201. Patented July 19, 1892.

Witnesses
Geo. W. Young.
N. E. Oliphant

Inventor
Frank H. Bolte
By H. G. Underwood
Attorney

UNITED STATES PATENT OFFICE.

FRANK H. BOLTE, OF MILWAUKEE, WISCONSIN, ASSIGNOR OF ONE-HALF TO PARKER H. SERCOMBE, OF SAME PLACE.

VELOCIPEDE-WHEEL TIRE.

SPECIFICATION forming part of Letters Patent No. 479,201, dated July 19, 1892.

Application filed February 9, 1891. Serial No. 380,813. (No model.)

*To all whom it may concern:*

Be it known that I, FRANK H. BOLTE, a citizen of the United States, and a resident of Milwaukee, in the county of Milwaukee, and in the State of Wisconsin, have invented certain new and useful Improvements in Velocipede-Tires; and I do hereby declare that the following is a full, clear, and exact description thereof.

My invention consists in certain peculiarities of construction and combination of parts to be hereinafter described with reference to the accompanying drawings and subsequently claimed.

Figure 1:
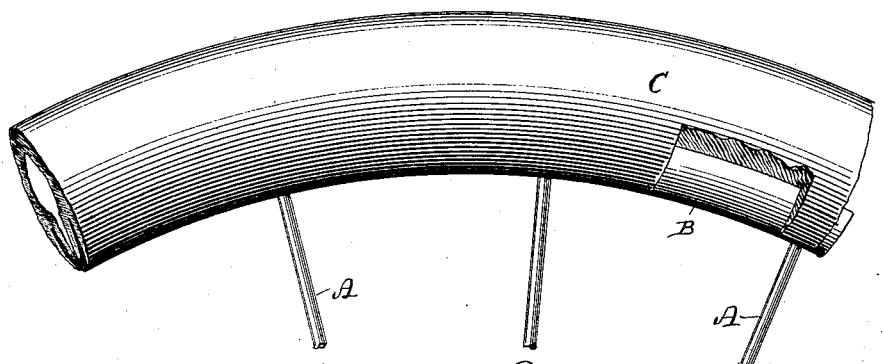
Figure 2:
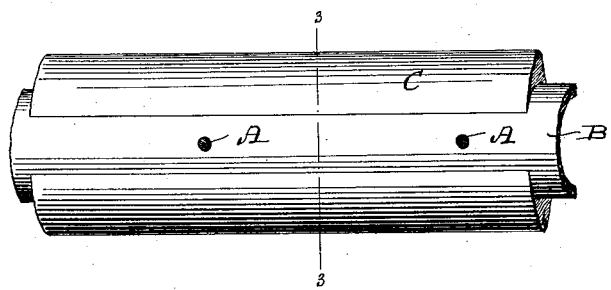
Figure 3:
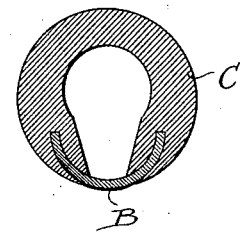

In the drawings, Figure 1 represents a portion of a velocipede-wheel provided with a cushion-tire constructed according to my invention; Fig. 2, an inside view of a portion of the wheel rim and tire, the spokes being in section; Fig. 3, a section on line 3 3 of the preceding figure, and Fig. 4 a similar view illustrating another form of my cushion-tire.

Referring by letter to the drawings, A represents the spokes, and B the rim, of a wheel constructed to receive an elastic tire, such wheels being common in bicycles and analogous vehicles. While I have shown a solid rim, it is common practice to make the latter hollow, and my improved cushion-tire, to be hereinafter described, is applicable to either style of rim, the latter being no part of my invention except in combination with said tire.

Cushion-tires are of themselves old in the art; but so far as I am aware it has been usual to cement or otherwise secure the same wholly within the concave outer faces of the wheel-rims, and therefore it is requisite that separate tires be made for each gage of said rims, while it also frequently happens that in substituting cushion-tires for the solid tires of old vehicles the forks or shape of the wheel-rims belonging thereto have to be changed, thereby increasing the expense.

My invention has for its object to avoid the difficulties heretofore experienced and provide a cushion-tire that may be more securely fastened to a wheel-rim than is ordinarily the case and which will exert the greatest possible resistance against lateral strain without being subject to wear against the edges of said wheel-rim.

The cushion-tire C herein shown and to be now described consists of a tubular roll of elastic moldable material, such as rubber, as is commonly employed, the bore of the roll being preferably eccentric in order that a greater thickness of the material may be had that side of the same that comes adjacent to the rim of a wheel.

That portion of the tire that comes adjacent to the rim of a wheel is provided with a seat having the contour of said rim, (the latter being concave upon its outer periphery,) but eccentric to the tire itself when the latter is viewed in transverse section. The rim-seat is the result of forming circumferential recesses in the body of the tire on opposite sides of its radius eccentric to the center of said tire in transverse section at any point of its circumference, as best illustrated in Figs. 3 and 4.

The wheel rim and tire are united by cement, chemical process, or other suitable means, and as said rim is embedded in the tire there can be no wear or cutting of the latter on the edges of the former to the detriment of said tire, and lateral strain in one direction is met by a corresponding resistance in the other. This of itself is of material advantage, as it prevents the loosening of the aforesaid tire.

Figure 4:
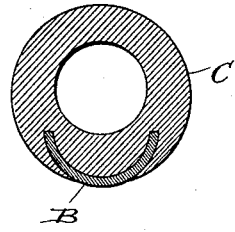

In that form of my invention illustrated in Fig. 4 the tire is solid between its bore and the adjacent wheel-rim, this construction being for employment in connection with new wheels or where the radius of the rim-seat in said tire is equal to that of a certain gage of rim.

In Fig. 3 I show the tubular tire slotted between its bore and periphery, and tires thus constructed may be contracted or expanded to enable the slits or recesses therein to engage with wheel-rims of any gage, whereby I am enabled to substitute cushion-tires for the solid ones in common use regardless of the width of said wheel-rims, and also without changing the axle-carrying forks of such wheels, as is usually necessary in substituting the ordinary cushion-tires for those having a solid body.

In either form of cushion-tire shown the wheel-rim is embedded therein, and as it may be found desirable to provide solid tires with seats such as I have described in order to have some of the material lap over the edges of wheel-rims, as above described, I do not wish to be understood as limiting myself to a cushion-tire concerning this feature of my invention.

Ordinarily the tire-seat of a velocipede-wheel-rim has the same radius in transverse section as the tire, and therefore the greater the diameter of the tire-body in like section the greater the width of the rim and a corresponding loss of resistance of said wheel-rim against buckling.

By my invention I am enabled to use a wheel-rim having a tire-seat of small radius in transverse section in connection with a tire of materially greater radius in like section, and thereby I gain all the advantages of such a tire with an increased stiffness of wheel. In other words, I am enabled to use a tire having its body of more than ordinary diameter in cross-section on a wheel having a narrow rim, this being of material advantage in the art to which my invention relates.

Having thus described my invention, what I claim as new, and desire to secure by Letters Patent, is—

1. The combination, with a wheel-rim having a concave outer periphery, of an elastic tire in which that portion thereof adjacent to the wheel-rim is in the form of a seat that engages this rim, but is eccentric to the tire itself when the latter is viewed in transverse section, substantially as set forth.

2. The combination, with a wheel-rim having a concave outer periphery, of an elastic tire in which that portion thereof adjacent to the wheel-rim is provided with a seat for the same, this seat being the result of forming circumferential recesses in the body of the tire on opposite sides of its radius eccentric to the center of said tire in transverse section at any point of its circumference, substantially as set forth.

In testimony that I claim the foregoing I have hereunto set my hand, at Milwaukee, in the county of Milwaukee and State of Wisconsin, in the presence of two witnesses.

FRANK H. BOLTE.

Witnesses:
N. E. OLIPHANT,
WM. KLUG.